United States Patent [19]

Avnet et al.

[11] Patent Number: 5,291,003

[45] Date of Patent: Mar. 1, 1994

[54] MODULAR CASH CARD SYSTEM DESIGN

[75] Inventors: Allan Avnet, Orange County; Brian R. Drugge, Santa Clara County, both of Calif.

[73] Assignee: VeriFone, Inc., Redwood City, Calif.

[21] Appl. No.: 777,764

[22] Filed: Oct. 11, 1991

[51] Int. Cl.$^5$ .............................................. G07F 7/02
[52] U.S. Cl. ..................................... 235/381; 902/30; 109/2
[58] Field of Search ........................ 235/381, 449, 492; 902/30; 364/479; 361/380, 390; 109/1 V, 2, 53, 58, 68

[56] References Cited

U.S. PATENT DOCUMENTS

| Re. 28,701 | 1/1976 | Edwards et al. | 235/381 |
|---|---|---|---|
| 3,786,421 | 1/1974 | Wostl et al. | 340/149 |
| 3,826,344 | 7/1974 | Wahlberg | 186/1 |
| 4,179,723 | 12/1979 | Spencer | 902/30 X |
| 4,449,186 | 5/1984 | Kelly et al. | 364/407 |
| 4,497,261 | 2/1985 | Ferris et al. | 902/30 X |
| 4,669,596 | 6/1987 | Capers et al. | 194/210 |
| 4,812,629 | 3/1989 | O'Neil et al. | 235/383 |
| 4,818,854 | 4/1989 | Davies et al. | 235/381 |
| 4,884,212 | 11/1989 | Stutsman | 364/479 |
| 4,977,502 | 12/1990 | Baker et al. | 235/384 X |

OTHER PUBLICATIONS

U.S. Application Ser. No. 07/775,736 filed Oct. 11, 1991, Attorney Docket No. A55553/JAS, Co-pending application, Not issued, Applicants Dich C. Tran et al., System and Method for Dispensing and Revaluing Cash Cards.
VeriFone, Inc.-Marketing Brochure, ValuCard Systems Mar. 1991.
VeriFone, Inc.-Annual Report Annual Report, Jan. 1991.
VeriFone, Inc.-Transaction Automation Marketing Brochure, Transaction Automation, Jan. 1991.
MARS Electronics Marketing Brochure, Presenting MARS Multicard.
MARS Electronics Marketing Brochure, MULTI-CARD, May 1987.
MARS Electronics Marketing Brochure, Cashless Vending-Multicard MS 5504/10, 4 & 10 Price Controllers, Jun. 1986.
MARS Electronics Marketing Brochure, Cashless Vending-Executive Controller & Card Reader, Jun. 1986.
MARS Electronics Marketing Brochure, Validation of Debit Cards for Vending and Catering, 1987.
MARS Electronics Marketing Brochure, Cashless Payment Systems, 1988.
MARS Electronics Marketing Brochure, Multicard May 1985.
MARS Electronics Marketing Brochure, Multicard--Card and Coin Payment Systems, Feb. 1987.
MARS Electronics Marketing Brochure, Multicard--Product Guide, Mar. 1987.

Primary Examiner—David C. Nelms
Assistant Examiner—John R. Lee
Attorney, Agent, or Firm—Flehr, Hohbach, Test, Albritton & Herbert

[57] ABSTRACT

A cash card dispensing apparatus having two or more payment options for purchasing cash cards, or adding credit to a cash card, is disclosed herein. Security features include a first inner compartment which is enclosed by a second compartment wherein a side panel is loosely fitted between the two compartments. Security features also include locking means for sealing throats in the first compartment's door which are not utilized for mounting an electronic component.

15 Claims, 5 Drawing Sheets

MODULAR CASH CARD SYSTEM DESIGN

CROSS-REFERENCE TO RELATED APPLICATIONS

Following applications assigned to the same assignee are incorporated herein by reference: U.S. application Ser. No. 07/775,738, Entitled "Linear Scanner Apparatus for Communicating with a Data Card"; U.S. application Ser. No. 07/775,736, Entitled "System and Method for Dispensing and Revaluing Cash Cards"; and U.S. application Ser. No. 07/775,266, Entitled "Dispensing Machine with Data Card Scanner Apparatus and Enhanced Features", all filed Oct. 11, 1991.

FIELD OF THE INVENTION

This invention relates to vending machine apparatus and methods, and more particularly, to dispensing machines which provide and credit cash cards.

BACKGROUND OF THE INVENTION

The vending machine industry occupies a substantial segment of the food industry. Many businesses and institutions provide food to their employees and guests which can be purchased from their own vending machine facilities. Often, businesses and institutions will own and supply a substantial number of vending machines. Vending machines may also stock non-food items.

Typically, a vending machine accepts payment in the form of coins and paper currency. However, with the advent of cash cards, vending machines also accept payment in the form of a cash card debit.

Cash cards are encoded with a credit balance when a user purchases credit from a cash card dispensing apparatus. Vending machines have the ability to read the cash card's encoding and debit the cash card's available balance for a purchase.

While the cash card dispensing apparatus described above has important attributes, it does not provide the ability to accept more than one form of payment, typically currency. Such a configuration is problematic in several ways. First, a user may have inadequate currency available to make the user's preferred choice. A sale in this circumstance is often lost. Furthermore, because the cash card dispensing apparatus only accepts currency, it is a ready target for force entry.

In providing a cash card dispensing apparatus, each individual apparatus is vulnerable to theft by forced entry. This is particularly problematic since often an entire vending facility's cash receipts are enclosed in the cash card dispensing apparatus. Therefore, some apparatus owners may prefer that their apparatus not accept currency for security purposes. However, some vending machine facilities are in districts of concern while others are not. Therefore, an upgradable apparatus design providing different levels of security according to need is desirable.

SUMMARY OF THE INVENTION

It is therefore a general object of the present invention to provide an improved cash card apparatus.

It is a further object of the present invention to provide a cash card apparatus which accepts more than one form of payment.

Another object of the invention is to provide a standardized cash card dispensing apparatus configuration in which different electronic components may be incorporated, e.g., for issuing data cards, revaluing or debiting cards, and for accepting different forms of payment, i.e., coins, dollar bills or credit cards.

It is another object of the present invention to provide an upgradable cash card dispensing apparatus for providing different levels of security according to need.

In accordance with these and other objects, the present invention includes an enclosure apparatus for components which dispense cash cards and provide credit to a cash card having a variable credit amount to be used by a user in subsequent transactions. More specifically, it includes a first inner compartment having a door on which electronic components may be mounted for access by a user. The first inner compartment is enclosed by a second compartment, also having a door. Depending on the business strategy of the vendor, a cash card dispenser, a cash card acceptor, a currency acceptor and/or a plastic bank card acceptor may be mounted to the first door and are accessible for transactions by a user. Each of those electronic components are mounted in standard throats provided in the first door.

A user may purchase a cash card or effect the addition of credit to a cash card, such indicated by a readout display for displaying transaction information mounted to the second door. Metal side panels may be loosely fitted in between the sides of the first compartment and the second compartment to prevent forced entry through the second compartment into the first compartment. Furthermore, locking means are provided for eliminating access to the interior of the first compartment through void throats.

BRIEF DESCRIPTION OF THE DRAWINGS

Other objects, and many of the intended advantages of the present invention, will be readily appreciated as the same becomes better understood by reference to the following detailed description when considered in connection with the accompanying drawings wherein.

DESCRIPTION OF THE PREFERRED EMBODIMENT

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the claims.

Figure 1:
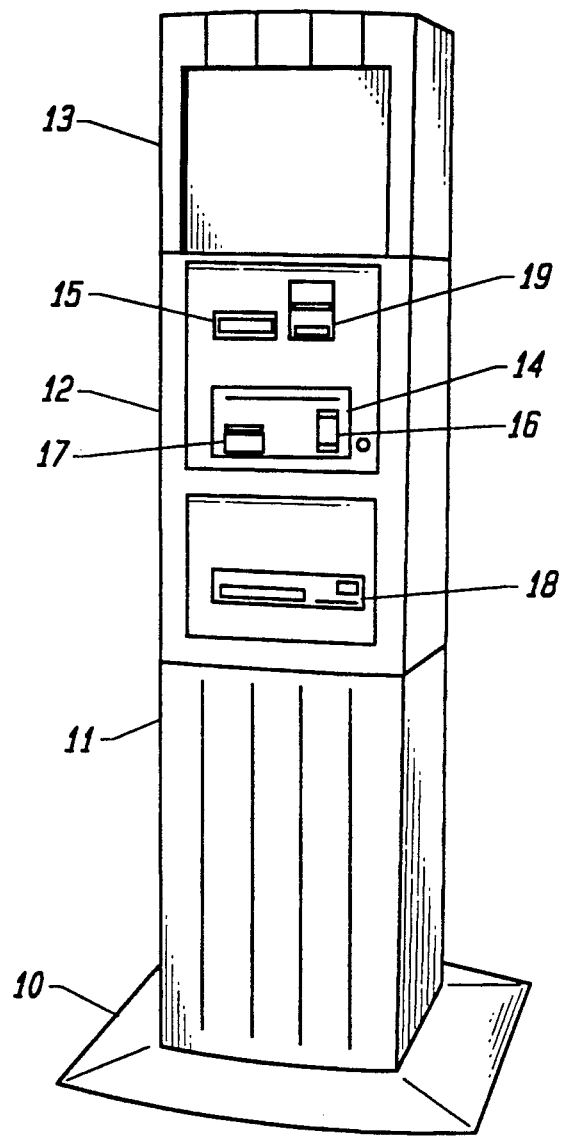
FIG. 1 shows a full view of a cash card dispensing apparatus of the present invention.

Attention is initially drawn to FIG. 1 which shows an elevation view of a cash card dispensing apparatus of the present invention. An essential element of the present invention is the combination of modules providing the user with physical configuration options. In one example, the unit takes a vertical configuration with four separate modules, a base 10, a lower support section 11, a middle section 12 providing the functions of the cash card dispensing apparatus, and a top section 13 which may be used for a variety of purposes, for example, providing a display. A unit may stand alone and apart from other vending machines. FIG. 1 depicts a cash card dispensing apparatus configuration having a base 10 for stability, enabling it to stand alone.

The modularity of the apparatus configuration, allows the use to implement different configurations. Typically, an apparatus will be placed adjacent to other vending machines and therefore, will not need a base 10. In that case, the apparatus comprising a lower support section 11, a middle section 12 providing the functions of the cash card dispensing apparatus, and a top section 13 is preferably 72 inches in height, which is the same height as typical vending machines. Therefore, the dimensions of the cash card dispensing apparatus configuration is in keeping with vending facilities' uniformity.

The modularity of the cash card dispensing apparatus of the present invention is further illustrated in that the middle section 12 could be incorporated into the structure of another vending machine. Moreover, the middle section 12 could be mounted in or on a wall such that lower support section 11 and top section 13 are not required. Furthermore, the middle section 12 and the top section 13 can be mounted to a table or desk, such that the lower support section 11 is not required. The modularity of the present invention provides the apparatus owner/user options in its configuration.

The owner/user is also has options with respect to the population of electronic components. For example, component 14 provides the user payment options for either the purchase of a cash card or for adding credit to the cash card. In the preferred embodiment shown in FIG. 1, component comprising a currency acceptor 16 and a plastic bank card acceptor 17 provide the user two payment options. The plastic bank card used can be either a credit card and/or a debit card. Other forms of payment may also be envisioned, for example, a check or a bank draft. When a cash card is purchased, it is dispensed by cash card dispenser incorporated as component 18. If the user chooses to add value to a cash card, cash card acceptor, component 19 receives a cash card, evaluates its current credit value and adjusts the credit according to either the currency received by the currency acceptor 16 or the plastic bank card acceptor 17. A readout display 15 displays transaction information.

Figure 2:
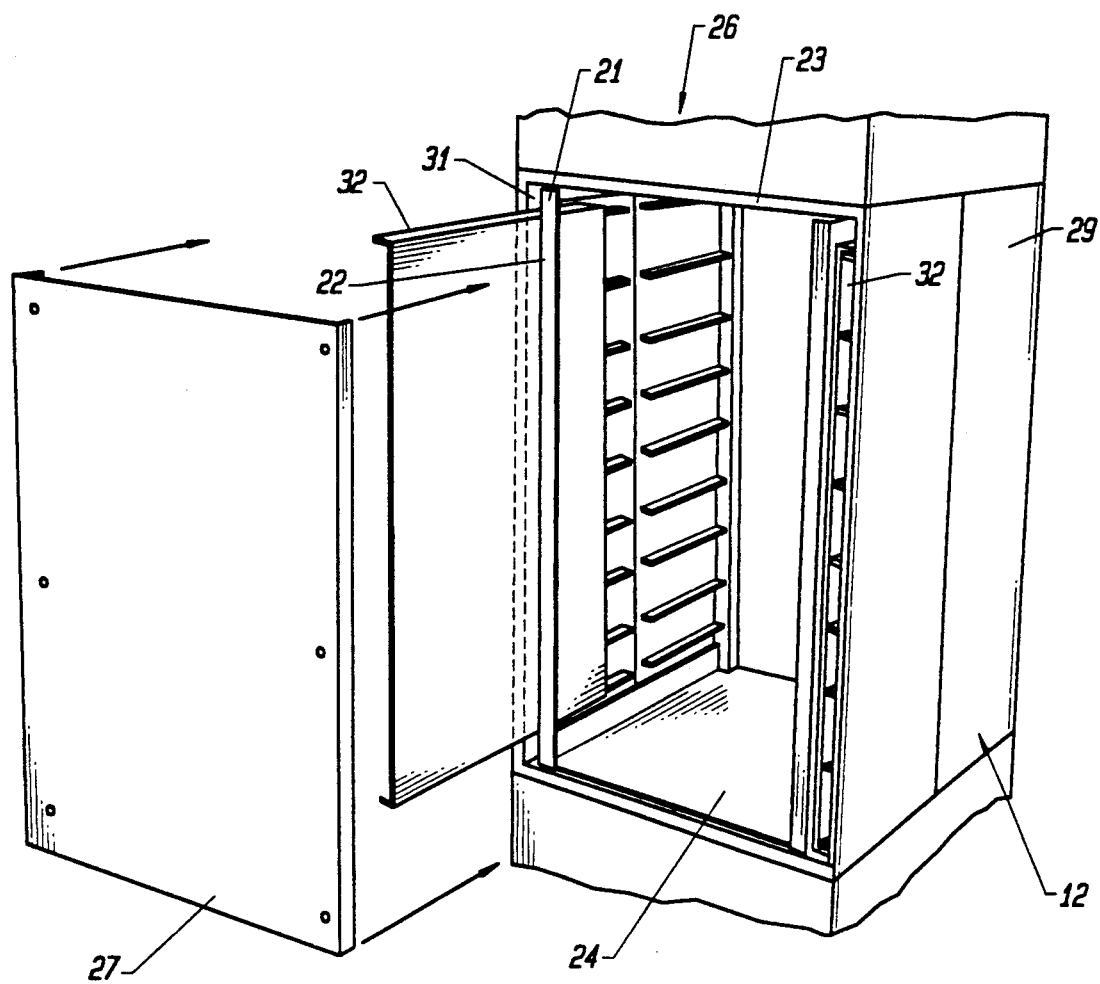
FIG. 2 shows an expanded view of a security element of the present invention from the rear portion of the apparatus.

As stated above, the security needs of the cash card dispensing apparatus depends upon the location of the vending facility serviced by the apparatus. Therefore, it is desirable to provide security enhancement options to facility owners for customization of their apparatus. Accordingly, as shown in FIG. 2, the middle section's 12 housing includes a metal cage 21 made of a suitable material for stability and security purposes. The cage configuration is provided to reduce cost in the event that security to the apparatus is not required. The cage 21 has corner edges defining boundaries of sides 22, top 23, bottom 24, front 26 and back 27. It should be noted, however, that the shape of the housing may differ than that shown as the preferred embodiment and still provide the stated purpose of present invention. For example, the housing may have an hexagonal shape, have rounded edges or have a spherical shape.

Figure 4:
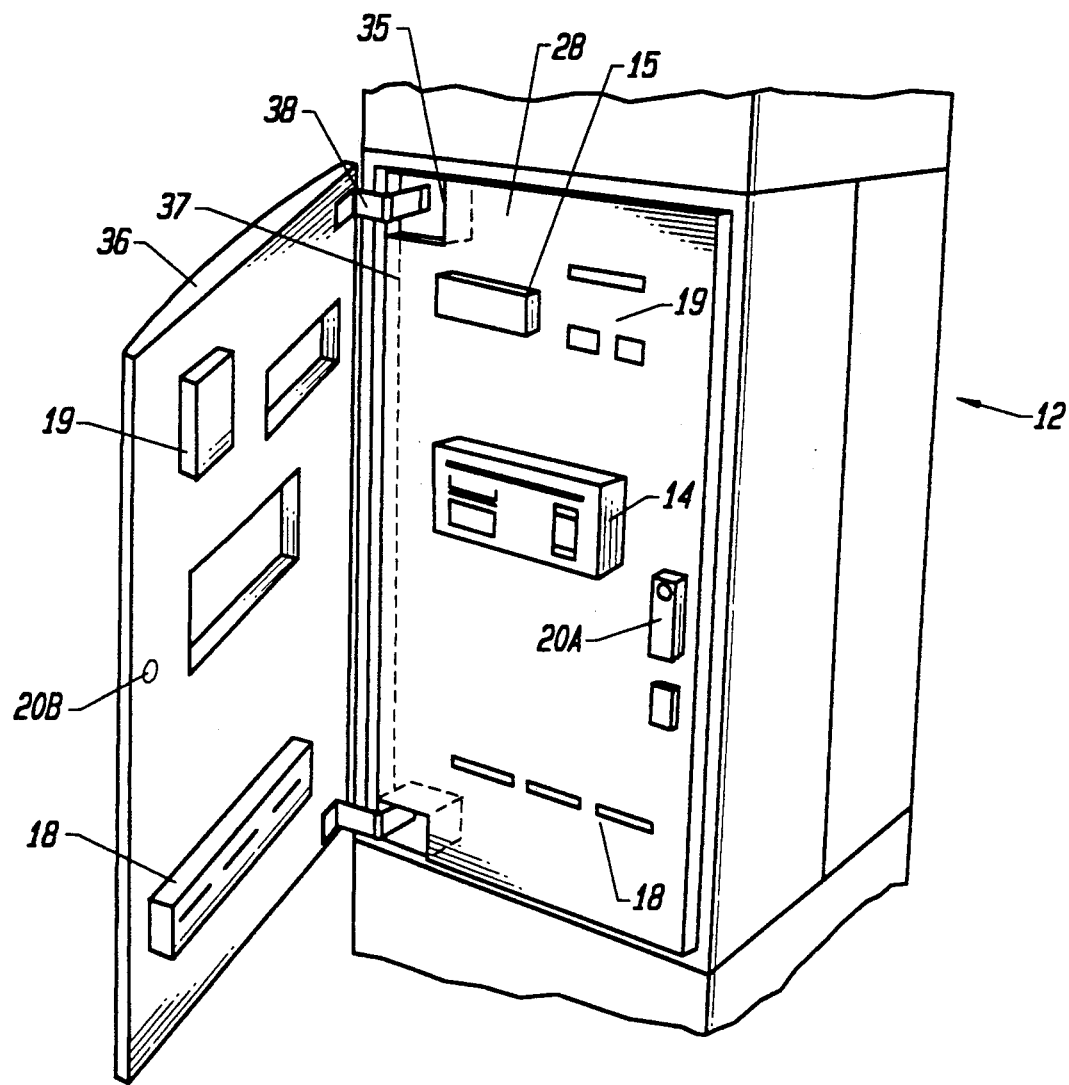
FIG. 4 shows a preferred configuration of some electronic components of the present invention.
Figure 5:
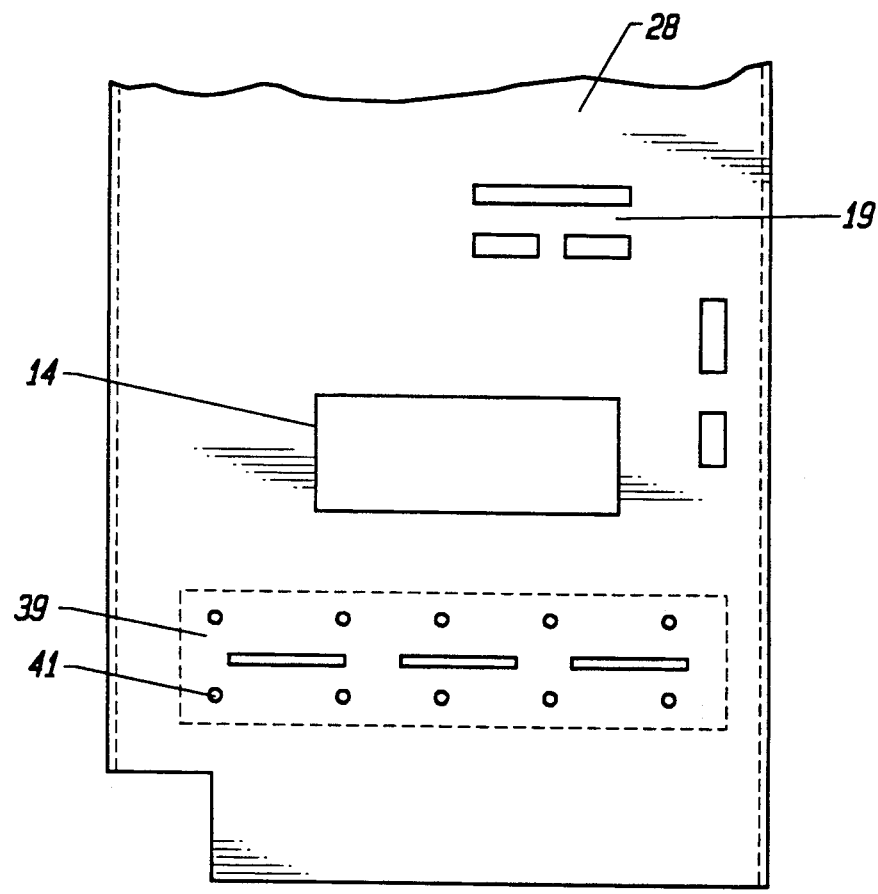
FIG. 5 shows a front view of an interior door having a security feature of the present invention.

The metal cage 21 is fitted with a metal door 28 on the front portion 26 of the cage shown in detail in FIGS. 4 and 5. FIG. 2, however, depicts the present invention from its rear portion. Metal cage 21 is enclosed by a second compartment 29 which in the preferred embodiment provides the exterior boundaries of the apparatus. Typically, the second compartment is made of plastic or other visually pleasing material. If more security is desired, the second compartment can be made of metal and/or can be enclosed by a third compartment. FIG. 2 shows that there is a space 31 in between the metal cage and the second compartment. According to the present invention, a metal side panel 32 may be placed between cage 21 and the second compartment 29 in space 31. Likewise, a side panel is loosely placed in the opposite side of the apparatus. Back 27 is then placed over the back portion of the apparatus and secured by suitable means, leaving side panel 32 loosely fitted.

Figure 3:
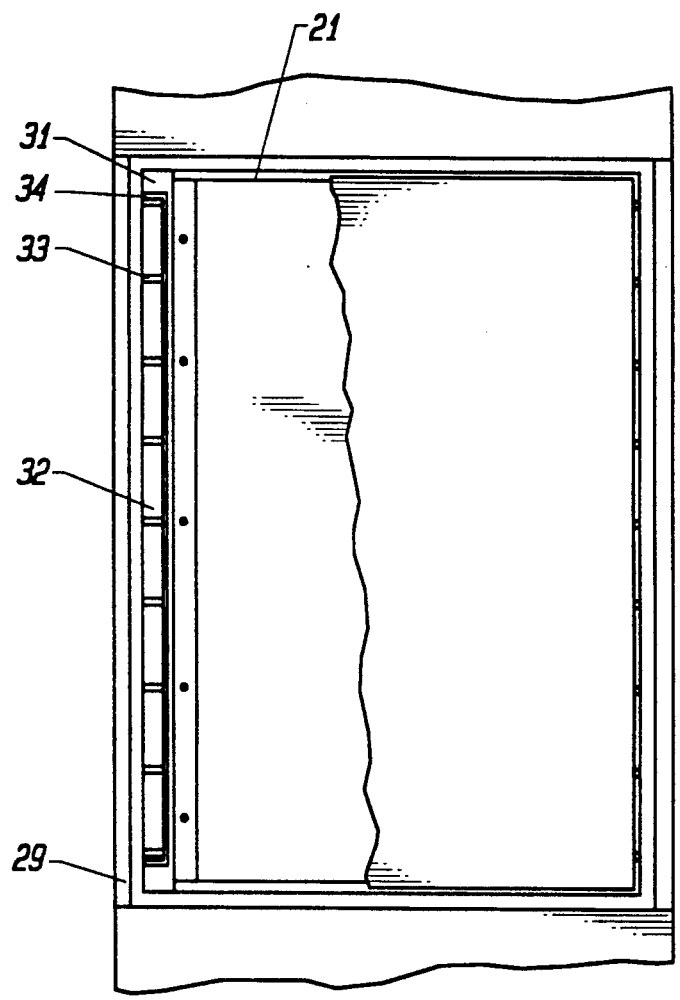
FIG. 3 shows a rear elevation view of the present invention partially broken away.

By providing loosely fitted side panels, were a potential thief to attempt to drill through a side of apparatus, a drill bit would rattle about and not be able penetrate due to the instability of the target. FIG. 3 shows the preferred embodiment more specifically. Second compartment 29 has horizontal ribs 33 for added stability. Side panel 32 has rolled edges 34 which fit over the distal ribs 33, therefore, loosely fitting the side panel 32 in between cage 21 and the second compartment 29 in space 31. Of course, the present invention could include other suitable means than those shown in the preferred embodiment for loosely fitting side panels, a back panel, a top panel, a bottom panel or a door.

FIG. 4 shows the preferred configuration of the electronic components mounted in the metal door 28. In the present invention, which has at least two payment options, a currency and plastic bank card acceptor embodied as components 16, 17 are each mounted through a throat in metal door 28 such that their electronics and their contents are contained in the interior of the compartment. Furthermore, components for cash card acceptor 19 and cash card dispenser 18 are also each mounted through a throat in the metal door 28. The readout display 15, viewed by a user, is mounted to the exterior of the first compartment's door 36 for readability. The metal door has continuous hinges 37 and hinge mounting spaces 35 where the second compartment's door's 36 hinges 38 are mounted. Hinges 38 spring open horizontally and then pivotally swing open for access to the interior. This configuration allows the doors to be mounted close to one another. There are locks on each compartment's doors, specifically, a heavy duty lock 20a securing the first compartment and a lock 20b securing the second compartment.

The configuration of FIG. 4 provides mutual security between the electronic components, in that there is no easy access to the interior of the apparatus as long as all the components are positioned in the throats provided. It is an object of the present invention to provide a cost effective manner in which to manufacture such metal doors while still providing the ability to upgrade the security features of each apparatus for its intended purpose. Security enhancement for owners of cash card dispensing apparatus' is an important feature of the present invention. For example, an institution may have many vending machine facilities, however, may prefer to keep the cash card dispenser or currency acceptor in an area which is more secure than other areas.

Were a prospective apparatus owner to prefer a different population of electronic components than that shown in FIGS. 1 and 4, and for example, not to have a cash card dispenser, a secure apparatus in the absence of cash card dispenser 18 would require manufacturing doors without a cash card dispenser throat. However, manufacture of custom doors is expensive and inefficient. In accordance with the present invention, FIG. 5 shows a front view of an interior door 28 having locking means providing security upgradablity. The throat in door 28 is sealed in the event that a particular electronic component is not provided. Locking means, in the preferred embodiment is a plate 39 positioned and securely mounted over a throat. Plate 39 is preferably metal to afford security to the valuable contents. Headless screws 41 inserted from the inside the door or welding, for example, can be used for securely mounting plate 39 to door 28.

The exterior compartment is typically plastic. Therefore, manufacture of exterior doors having any number of throats can be achieved by injection molding. Therefore, the exterior of the apparatus, visually, does not reveal the presence of the interior door 28 sealed by locking means.

It is clear that the general object of the present invention to provide an improved cash card apparatus has been met. Moreover, the object of the present invention to provide a cash card dispensing apparatus which accepts more than one form of payment has also been met. Also, the object of the present invention to provide a upgradable cash card dispensing apparatus for providing enhanced levels of security according to need has been met.

While the present invention has been shown and described in what is presently conceived to be the most practical and preferred embodiment of the invention, it will become apparent to those of ordinary skill in the art that many modifications thereof may be made within the scope of the invention, which scope is to be accorded the broadest interpretation of the claims so as to encompass all equivalent structures.

What is claimed is:

1. A secure modular cash card dispensing and revaluation apparatus, comprising:
   a security upgradable anti-forced-entry anti-theft security enclosure comprising fixed wall panels defining the boundary of said security enclosure; and loosely fitted panels mounted within and movable relative to said fixed wall panels; and
   a cash card dispenser apparatus for dispensing and providing value to a cash card, said dispenser apparatus contained substantially within said security enclosure as defined by said loosely fitted panels.

2. The apparatus in claim 1, wherein said security enclosure further comprises:
   a first inner secure compartment comprising a metal cage having corner edges defining its boundaries; and
   wherein said fixed wall panels define a second compartment and enclose said first compartment; and
   said loosely fitted panels are metal panels loosely fitted in between said first compartment and said second compartment to prevent forced entry through said second compartment into said first compartment.

3. The apparatus in claim 1, wherein:
   said second compartment has a plurality of ribs, some of which are distal ribs;
   said metal panels have rolled edges; and
   said rolled edges fit over said distal ribs.

4. The apparatus in claim 2, wherein:
   said corner edges defining said cage boundary define boundaries of sides, top, bottom, front and back of said first compartment; and
   said walls defining said second compartment exterior and enclosing said first compartment define sides, a top, a bottom, a front, and a back of said second compartment.

5. The apparatus in claim 4, wherein:
   said second compartment has a plurality of ribs, some of which are distal ribs;
   said metal panels have rolled edges; and
   said rolled edges fit over said distal ribs.

6. The apparatus in claim 4, wherein:
   said first compartment further includes a first door in said front;
   said first door having a plurality of throats, each of which is adapted for positioning a component to be accessed from outside said first and second compartments; and
   wherein said security enclosure further comprises:
   locking means for eliminating access to the interior of said first compartment through those of said throats void of a component.

7. The apparatus in claim 6, wherein said second compartment further includes a second door in said front of said second compartment.

8. The apparatus in claim 7, further comprising a lower support section disposed between a supporting surface and said security enclosure.

9. The apparatus in claim 7, further comprising a top display section attachable to the top of said security enclosure.

10. The apparatus in claim 7, further comprising:
    a base section; said lower support section attachable to said base section, and said base section interposed between said supporting surface and said lower section.

11. The apparatus in claim 7, further comprising:
    a lower support section disposed between a supporting surface and said security enclosure;
    a base section; said lower support section attachable to said base section, and said base section interposed between said supporting surface and said lower section; and
    a top display section attachable to the top of said security enclosure.

12. The apparatus in claim 6, wherein said cash card dispenser apparatus for dispensing and providing value to a cash card comprises:
    a cash card dispenser;
    a cash card acceptor for receiving one of said cash cards and for evaluating and adjusting the credit value existing on said cash card;
    a currency acceptor for accepting currency providing a user with first and second options for the use of said currency;
    said first option effecting a purchase of a cash card, said cash card dispensed by said cash card dispenser;
    said second option effecting the addition of value to a cash card received by said cash card acceptor; and
    a transaction readout display for displaying transaction information.

13. The apparatus in claim 12, wherein each of said cash card dispenser, said cash card acceptor, said currency acceptor, and said readout display are mounted to said first door.

14. The apparatus in claim 13, further comprising:
a plastic bank card acceptor providing a user with said first and second options for the use of said plastic bank card, said bank card acceptor mounted to said first door.

15. The apparatus in claim 11, wherein the combination of said lower section, said security enclosure section, and said top section is approximately 72 inches in height.

* * * * *

UNITED STATES PATENT AND TRADEMARK OFFICE
CERTIFICATE OF CORRECTION

PATENT NO.    : 5,291,003
DATED         : March 1, 1994
INVENTOR(S)   : Avnet et al.

It is certified that error appears in the above-identified patent and that said Letters Patent is hereby corrected as shown below:

Column 5,
Line 64, delete "claim 1" and insert therefor -- claim 2 --

Signed and Sealed this

Eleventh Day of March, 2003

JAMES E. ROGAN
*Director of the United States Patent and Trademark Office*